(12) United States Patent
Kelley

(10) Patent No.: US 7,176,812 B1
(45) Date of Patent: Feb. 13, 2007

(54) WIRELESS BLADE MONITORING SYSTEM AND PROCESS

(75) Inventor: Kerry Keith Kelley, Lexington Park, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/198,415

(22) Filed: Aug. 4, 2005

(51) Int. Cl.
*G08B 1/08* (2006.01)
*G08B 13/20* (2006.01)
*G08B 21/00* (2006.01)
*H04Q 5/22* (2006.01)
*B63H 1/00* (2006.01)
*B63H 1/26* (2006.01)

(52) U.S. Cl. .............. 340/946; 340/539.1; 340/539.22; 340/544; 340/686.3; 340/10.34; 340/10.5; 416/61; 416/223 R; 416/226; 416/230

(58) Field of Classification Search .............. 340/539.1, 340/539.22, 544, 946, 686.3, 10.34, 10.5; 416/61, 226, 230, 223 R
See application file for complete search history.

(56) References Cited

U.S. PATENT DOCUMENTS

| | | | | |
|---|---|---|---|---|
| 3,739,376 A | * | 6/1973 | Keledy ........................ 340/946 |
| 4,106,332 A | * | 8/1978 | McKeown .................... 73/104 |
| 4,120,610 A | * | 10/1978 | Braswell et al. ............. 416/226 |
| 4,345,237 A | * | 8/1982 | Lerche et al. ................ 340/946 |
| 4,524,620 A | * | 6/1985 | Wright et al. ................. 73/587 |
| 4,717,907 A | * | 1/1988 | Troy .......................... 340/544 |
| 5,014,544 A | * | 5/1991 | West .......................... 73/40.7 |
| 5,205,710 A | * | 4/1993 | Engels et al. ................. 416/61 |
| 5,970,393 A | * | 10/1999 | Khorrami et al. ........... 455/129 |
| 6,278,379 B1 | * | 8/2001 | Allen et al. ............ 340/870.16 |
| 6,693,548 B2 | * | 2/2004 | Boyce et al. ................ 340/657 |
| 7,018,217 B2 | * | 3/2006 | Marshall et al. .............. 439/67 |

* cited by examiner

*Primary Examiner*—Daniel Wu
*Assistant Examiner*—Lam Pham
(74) *Attorney, Agent, or Firm*—John Gladstone Mills, III; Timothy J. Slabouz; NAVAIR (Naval Air Systems Command)

(57) ABSTRACT

The present invention can be generally described as a blade monitoring and wireless communications system. This monitoring and communications system is formed by the integration of commonly available or easily developed hardware and/or software components, which may be controlled by non-proprietary, open architecture software. This allows the present invention to easily incorporate a variety of sensors and/or detectors; thereby, providing the user with the first blade monitoring system capable of providing an improved blade monitoring capability.

11 Claims, 2 Drawing Sheets

WIRELESS BLADE MONITORING SYSTEM AND PROCESS

CROSS REFERENCE TO RELATED APPLICATIONS

Not Applicable.

STATEMENT REGARDING FEDERALLY SPONSORED RESEARCH OR DEVELOPMENT

The invention described herein may be manufactured and used by or for the Government of the United States of America for governmental purposes without payment of any royalties thereon or therefor.

REFERENCE TO A SEQUENCE LISTING, A TABLE, OR A COMPUTER PROGRAM LISTING COMPACT DISK APPENDIX

Not Applicable.

BACKGROUND OF THE INVENTION

The present invention generally relates to a system and process capable of providing a real time, in-flight advisory of the structural condition of a helicopter's rotor blade(s). In general, rotor blades have a finite operating life, and they can be rendered unserviceable due to damage and fatigue wear. Failure of the blade spar in flight can be catastrophic; therefore, early blade damage detection and/or blade condition information may provide the capability to avoid blade associated flight hazards. Relatedly, the United States Navy (Navy) and the United States Marine Corps (USMC), as well as Original Equipment Manufacturers (OEM), have determined that there is a need to provide an in-flight warning (or an indication) of blade damage when appropriate, and have used inert-gas-charged spars as a means for determining the condition or the structural integrity of the spar. More specifically, fatigue wear of a spar may cause microscopic cracks to develop in the spar, which should cause the gas to leak from the spar, and which, if such leakage becomes significant, may require the replacement of the blade. Moreover, once the spar gas charge has leaked, due to a crack or damage, the remaining safe flight time for a damaged blade is generally insufficient to continue a mission to normal completion. In other words, the remaining mission time could exceed the remaining spar-life-to-failure-time, which may result in an in-flight failure of the blade. Consequently, in the prior art, a means used to detect spar gas leakage and to provide an indication of a possibly cracked or damaged blade was generally comprised of a pressure detector or pressure activated mechanical device capable of providing a low gas charge pressure warning (or other indication).

As an example of such prior art system, the system currently being used by the Navy and the USMC is called the In-flight Blade Inspection System (IBIS). In general, the IBIS utilizes a radioactive, Strontium 90 source, which is located near the blade root (i.e., the end of the blade nearest the rotor hub) in a removable pressure switch indicator module called the IBIS indicator. This radioactive source is manipulated by the pressure switch in relation to the charge pressure and, based on such manipulation and in association with the use of a radioactivity level-monitoring device located in the aircraft, is capable of providing an indication of a low-pressure condition. Furthermore, the use of radioactive sources is not limited to use outside the aircraft. In addition, the radioactivity level-monitoring device (Detector), used with the IBIS, may contain more of the Strontium 90 isotope.

Because of this, each of these devices, i.e., one indicator per blade and one Detector per aircraft, must be handled as radioactive components, which generally affects the costs associated with repairing, replacing, installing and/or maintaining these devices. Furthermore, the disposal and environmental costs associated with radioactive materials are (or can be) substantial. Moreover, the IBIS has several other significant disadvantages: (1) increased personnel hazards associated with the handling of radioactive material; (2) the incurring of additional costs due to special shipment and accounting procedures for radioactive items; (3) increased environmental hazards, especially in the case of flight or ground mishaps; (4) high repair and/or replacement costs; (5) high disposal costs; and (6) exposing personnel to radioactivity during maintenance and test procedures, which may be further exacerbated by requiring personnel to be in close proximity to the radioactive components.

Therefore, a need remains for a low-cost, yet robust, rotor blade monitoring system that can provide an improved in-flight indication of potential rotor blade faults without the use of radioactive isotopes, that is easy-to-use and relatively simple to manufacture and install on military and/or commercial helicopters—as well as on (or with) other platforms (or components) of interest.

BRIEF SUMMARY OF THE INVENTION

According to its major aspects and briefly recited, the present invention relates generally, but without limitation, to a system and/or process that is capable of providing an indication of in-flight blade conditions through the use of an inventive wireless monitoring and/or warning system. More specifically, the present invention wireless blade monitoring system (WBMS) is a system (and/or process) that utilizes low cost wireless technology, digital sensors, and machine control programming that are combined in an inventive and unique manner in order to produce a highly reliable advisory information system capable of enhancing flight safety, while reducing operating costs. Preferably, the WBMS is an invention that replaces the Strontium 90 isotope based IBIS indicator/detector with a wireless digital sensor based communication subsystem that is preferably comprised of: a condition detector and wireless communications module; an interrogator unit; and an information/warning display and/or indicator. Still more specifically, the condition detector and wireless communication module would be capable of sensing a blade's condition, i.e., the structural integrity of a helicopter's rotor blade, and, preferably, based on reading/measuring the pressure of a gas charged into at least one section of the rotor blade, would be able to communicate blade condition information to an aircraft mounted (or remote) wireless communications module. This blade condition information, as an example, could then be displayed on the Master Caution Panel of an existing cockpit display (Master Caution Panel) and/or a warning could be provided to a pilot, if appropriate.

A feature of the present invention is that it can provide blade condition and early damage detection information, which may provide the advantage of avoiding flight hazards.

Another feature of the present invention is that it does not require the use of radioactive sources, which provides the advantages of eliminating: the procurement of radioactive sources; the handling and disposal costs associated with such sources; and the exposure of personnel and the environment to radiation in the event of a flight or ground mishap.

Still another feature of the present invention is that it can be easily manufactured from low-cost, readily available and/or configurable devices, yet it provides the additional advantages of being highly durable and reliable, functionally and operationally simple to use, and easily installed.

Other features and their advantages will be apparent to those skilled in the art from a careful reading of the Detailed Description of the Invention, accompanied by the drawings.

DETAILED DESCRIPTION OF THE INVENTION

While the following discussion illustrates preferred embodiments of the present invention, it does not limit the present invention from being implemented (and/or configured) in a myriad of other manners within the spirit and scope of this Application. Moreover, while the devices, software, circuits, and/or other components used in the present invention preferably come from the group of devices, software, circuits, and/or other components that are well-known, and/or are commonly (or readily made) available, other means of implementing the present invention may also be used as well. Moreover, the use of the terms "machine controller," "processor" or "CPU" in any of their forms herein, should be construed to encompass the myriad of processing devices currently available, or which may become available in the future. For example, but not as a limitation, the machine controllers, processors and/or CPUs described herein, for use in the present invention, may include, but are not limited to: a "microprocessor," which is basically an entire CPU on a single chip and commonly referred to as a "microprocessor unit," and, if used with a power supply, memory and a clock, it would work like a computer; a "microcontroller," which is also known as a "computer on a chip," and is generally defined as: a single chip that contains the processor, RAM, ROM, clock and the I/O control unit; an "ASIC" ("Application Specific Integrated Circuit"), which is a chip that is custom designed for a specific application rather than a general-purpose chip such as a microprocessor; an "embedded system" which is basically a specialized computer for use in a specialized application and which may either use an embedded Operating System or have the Operating System and the specialized application combined into a single program; and a "Digital Signal Processor," which is a programmable CPU that is used for making analog to digital and/or digital to analog conversions and that includes fast instructions sequences commonly used in such conversion applications. Additionally the "machine controllers," the "processors" and/or the "CPUs" may be configured to use a "master-slave" communication protocol. Furthermore, while the name being used herein for the present invention is "Wireless Blade Monitoring System," it should not be considered that the present invention is limited to only being used on (or with) "blades," or more specifically, "helicopter blades."

Figure 1:
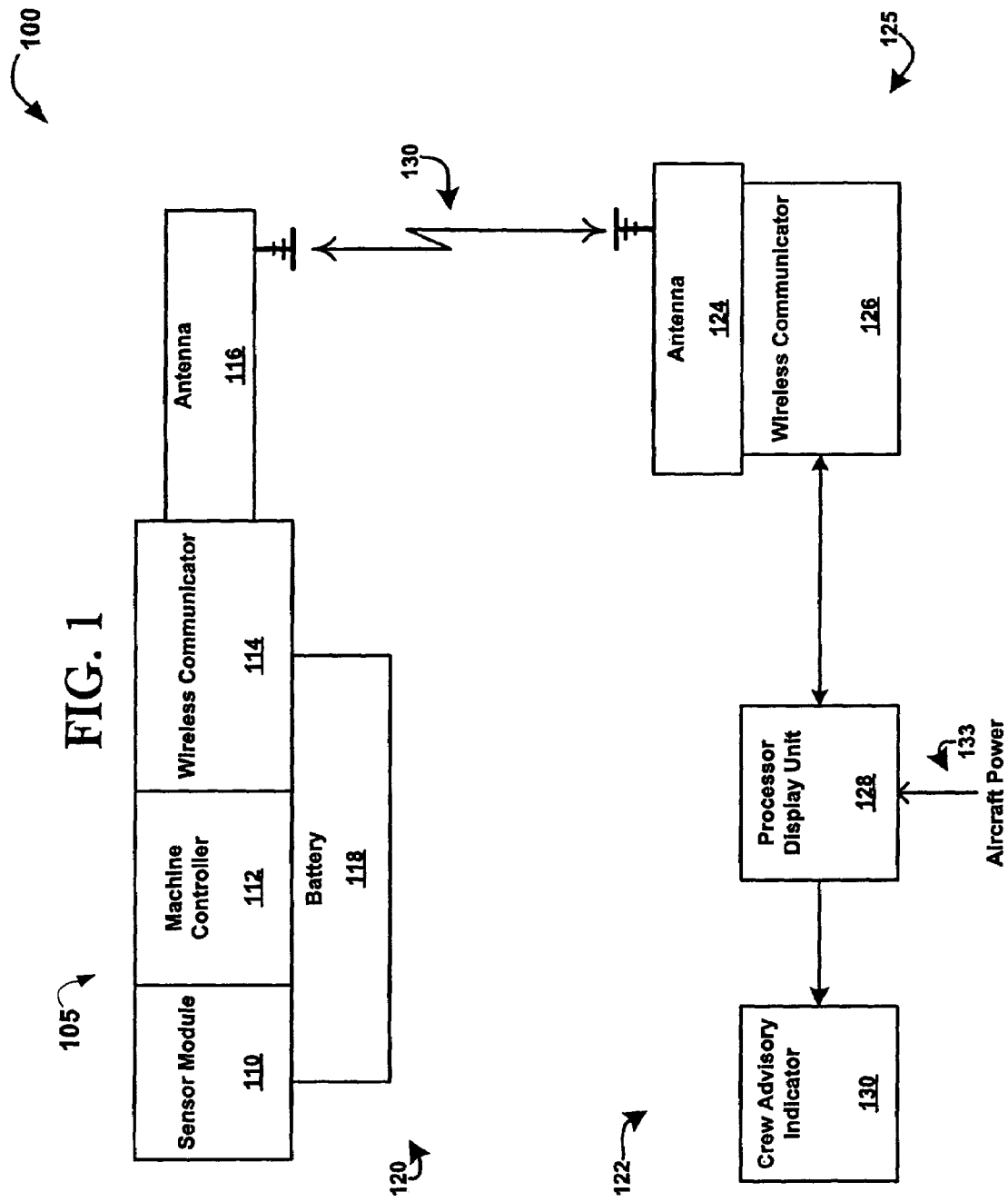
FIG. 1 is a block diagram illustrating a generic system configuration according to a preferred embodiment of the present invention.

Referring now to FIG. 1, a block diagram illustrating a generic system configuration of the Wireless Blade Monitoring System (WBMS) 100 is shown. As shown in FIG. 1, the WBMS 100 preferably consists of the following components and/or sub-systems: an Indicator Responder Unit (IRU) 105; an Interrogator Unit (IU) 125; a Processor Display Unit (PDU) 128; and a Crew Advisory Indicator (CAI) 130. Preferably, the IRU 105 would be comprised of a sensor module 110, a machine controller 112, a wireless communicator module 114, an antenna 116, and a replaceable (and/or rechargeable) extended life Battery 118, and could be mounted (or located) on a helicopter blade, but the placement of the IRU 105 (or its individual components and/or sub-systems) are not limited to such location. Preferably, the IU 125 would be comprised of an antenna 124 and a wireless communicator 126 as well, and could be mounted (or located) on (or in the vicinity of) an aircraft's fuselage, but the placement of the IU 125 (or its individual components and/or sub-systems) are not limited to such location. Moreover, and preferably, the Processor Display Unit (PDU) 128 and/or the Crew Advisory Indicator (CAI) 130 could be located in (or in the vicinity of) an aircraft's cockpit, but the placement of the IU 125 (or its individual components and/or sub-systems) are not limited to such location. Not shown, is an optional handheld Control and Display Unit (CDU), which may provide the capability to interrogate an IRU that may be either permanently or temporarily mounted on a blade, and which may be installed on a non-WBMS 100 configured helicopter. In other words, the CDU may be reserved for use in performing blade inspections and/or service work during maintenance type situations.

Figure 2:
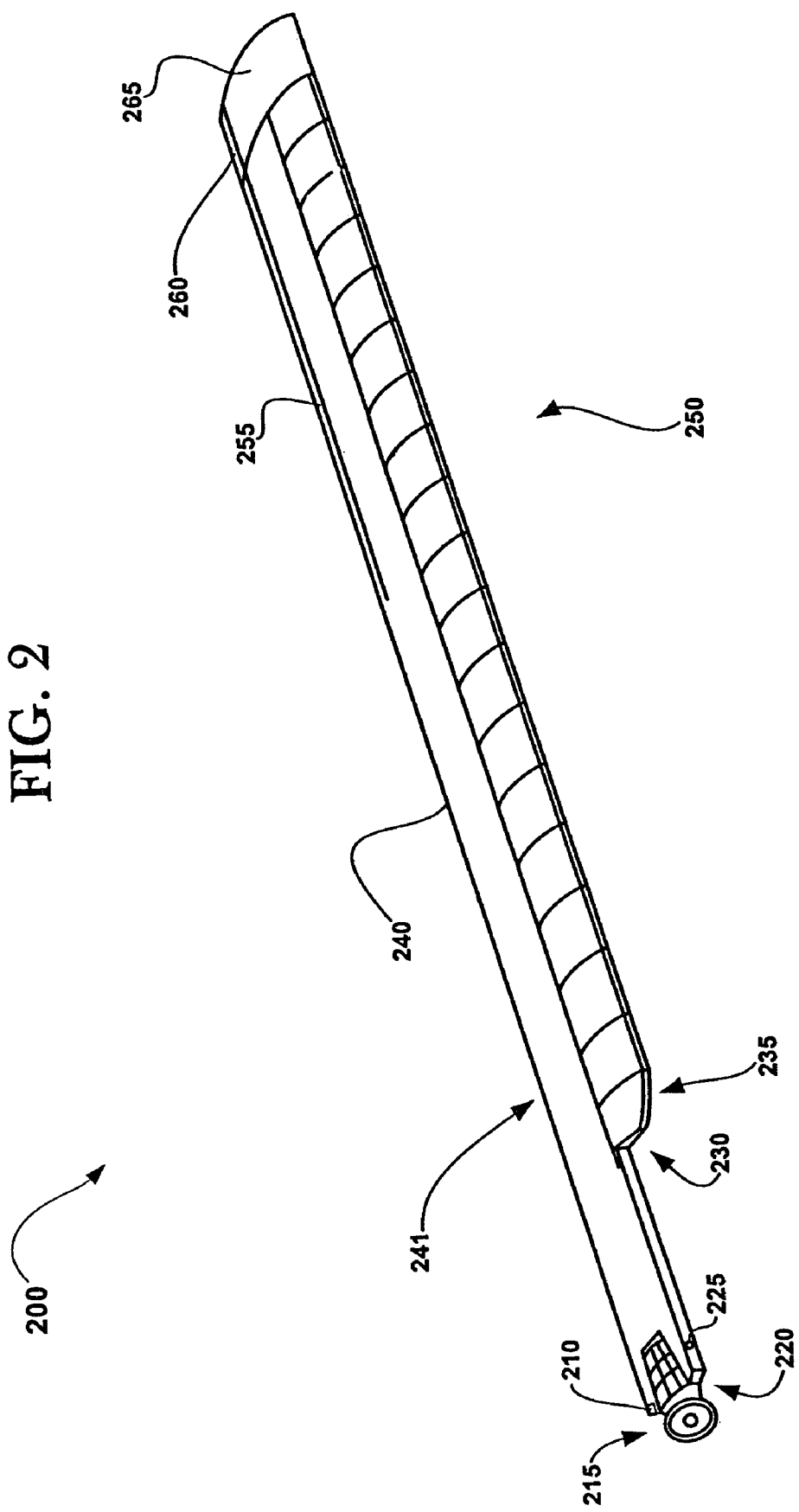
FIG. 2 is a perspective view of a helicopter rotor blade.

Referring now to FIG. 2 as background, a rotary wing blade 200 provides the lift necessary for flight, and, in general, each blade may include at least some of the following: a metal or composite 240, metal or composite pockets 250, a metal or composite tip cap 265, a metal or composite root cap 230, and a metal or composite cuff 215, which provides a means for attaching the blade 200 to the rotary wing head sleeve-spindles (not shown). Nickel-plated abrasion strips 255 and 260 are respectively bonded to the leading edges of the spar 240 and the tip cap 265 to prevent erosion, and vent holes (not shown) are located on the underside of each pocket to prevent moisture accumulation inside the blade 200. Preferably, the spar 240 is nitrogen-pressurized, and the blade 200 includes an air valve 225 in the spar backwall (near the root end) and a pressure indicator 210 in the forward surface of the root end plate 220. The root end plate 220, attached to the inboard end of the spar 240, and a seal plate inside the spar tip end (not shown), are sealed for pressurization. Using this configuration, if there is a failure (or fault) in the structural integrity of the spar 240, or of a seal, then the nitrogen gas charged into the spar 240 will leak. In the prior art, the result of a nitrogen leak would cause the pressure indicator 210, which may be compensated for temperature changes, to provide a low-pressure indication corresponding to the magnitude of the pressure level drop from normal charged levels in the spar 240. Generally, this indication was a visual display local to the pressure indicator 210. An improvement to this local, visual indication came in the form of the prior art In-Flight Blade Inspection System (IBIS), which made use of radioactive sources. This prior art system would increasingly expose a radioactive source as the nominal pressure drop inside the blade increased, which would cause a higher radiation level to be generated from the indicator and a higher reading on an associated radiation monitor on-board the aircraft.

Referring now to both FIGS. 1 and 2, the Indicator Responder Unit 105, preferably, would be mounted to the blade spar 240 via a threaded mechanical port. This would allow the IRU Digital Pressure Sensor (Sensor Module) 110 to measure (or gauge) the gas charge in the spar 240 to which it is attached. Preferably, the Interrogator Unit 125 (and its Wireless Communicator 126 and/or IU Antenna 124) would be located on (or near) the helicopter fuselage within range of the wireless communications provided by the IRU Antenna 116. Furthermore, and preferably, the Processor Display Unit 128 would be mounted internally and be accessible to the flight crew. Moreover, the Crew Advisory Indicator 130 would be preferably located on the flight crew's cockpit dash panel. Also, as shown in FIG. 2, the power for the fuselage associated items 125, 128 and 130 would be preferably supplied by internal aircraft power sources 133 while power for the IRU 105 would be preferably supplied by a Battery 118, which may be of any appropriate design, but, preferably, would be an extended life, replaceable and/or rechargeable battery—in which case, it may be possible to integrate the use of solar cells with the WBMS 100 in order to provide a recharging capability. (While these methods of powering the WBMS 100 may be preferable, the use of any other suitable source of power could be used just as well.)

Preferably, the IRU 105 could be mounted on the leading edge 241 of the rotor blade spar 240 near the root, e.g., near the steel cuff 215 as shown in FIG. 2, can be housed in a receptacle in the blade spar, or located in any other location where spar gas charge pressure may be sensed, e.g., the IRU 105 could be located in the vicinity of the pressure indicator 210 shown in FIG. 2. Preferably, the internal circuitry of the RU 105 would be housed in a module that is preferably Radio Frequency transparent and strengthened to withstand the rotor blade's 200 operating environment. Furthermore, the module (and/or the IRU 105) would be preferably located so that the performance of the wireless communications between the RU 105 and the IU 125 is maximized. As an example, the IRU 105 could be mounted on the blade 200 so that it extends out from the mounting receptacle into the space just forward of the leading edge of the blade 241. By doing this, it may be possible to develop proper polarization, and be able to maximize the field (and/or signal) strength at the antennae 116 and 124, which should result in the IRU 105 readily receiving and responding to interrogations from the IU 125. The Interrogator Unit 125 preferably provides wireless Radio Frequency (RF) connectivity to the individual IRUs 105 on each rotor blade. However, by substituting the appropriate devices and/or components into the WBMS 100, other forms of wireless or non-wireless communications including, but not limited to, the use of wireless infrared communications could be employed as well.

Furthermore, the PDU 128, preferably through the use of a firmware program installed in the PDU 128, can be used to control the operational modes of the IU 125. Moreover, the PDU 128 preferably houses the "system" processor and/or the "system" control program, and preferably provides local control (e.g., in a cockpit) and a display interface (not shown) for the WBMS 100. While the PDU 128 may preferably be a microcontroller or a microcomputer, any other suitable processing device could also be used as well, including, but not limited to, a computer or the myriad of other processing devices currently available, or which may become available in the future. Additionally, through the use of a Crew Advisory Indicator (CAI) 130, the PDU 128 preferably provides (or assists in providing) an indication of the existence of out-of-specification conditions on any installed blade. The PDU 128 can also be used to assist in (or perform) system testing or maintenance functions, e.g., the PDU 128 may be used to indicate if a Built-in-Test program step or background Built-in-Test fails a program step. Preferably, through the use of an additional firmware program that may be installed in each IRU 105, an IRU 105 would be capable of reading and storing a blade's spar gas charge, and making a determination as to whether a blade's spar gas charge is within specification. The IRU 105 would also be capable of communicating (i.e., transmitting and/or receiving) this and/or other information to the rest of the WBMS 100 via the Interrogator Unit 125. As an example, if the IRU 105 (including its associated sensors, devices, and/or programming) makes a determination that the condition of the blade's gas charge is out-of-specification, the RU 105 reports this condition-through the use of RF communications—to the Processor Display Unit 128, and the PDU 128 processes these signals and, if appropriate, annunciates the out-of-specification condition to the flight crew via the Crew Advisory Indicator 130. In another embodiment, the IRU 105, through the use of vibration sensors (or other vibration monitoring devices), may be used (or also used) to measure vibration and, in turn, provide an indication of a "section" of the rotor system that is being affected by the condition that is causing the generation of the excess vibration. In association with these sensors (and/or other devices) the firmware program installed in the IRU 105 should be capable of measuring and/or processing multi-axis vibration(s) or the signals associated with such vibration(s) in the blade spar, and be capable of storing this information for downloading, communicating, processing and/or further analysis. Notably, such use of the IRU 105 might be able to pinpoint the location of vibration related problems, and therefore, reduce the amount of time needed for troubleshooting and/or repair.

Finally, it will be apparent to those skilled in the art of blade monitoring systems design (and/or other related fields) that many other modifications and/or substitutions can be made to the foregoing preferred embodiments without departing from the spirit and scope of the present invention. The preferred embodiments and the best mode of the present invention are described herein. However, it should be understood that the best mode for carrying out the invention herein described is by way of illustration and not by way of limitation. Therefore, it is intended that the scope of the present invention include all of the modifications that incorporate its principal design features, and that the scope and limitations of the present invention should be determined by the scope of the appended claims and their equivalents.

What is claimed is:

1. A helicopter blade monitoring system, said monitoring system comprising:

an indicator responder unit including at least one structural integrity sensor attached to a helicopter blade capable of being filled with a pressurized gas;

said indicator responder unit capable of detecting, processing, and transmitting information associated with the structural integrity of said helicopter blade;

an interrogator unit in wireless communications with said indicator responder unit;

an operational control and display unit providing operational control of said indicator responder unit and said interrogator unit, and for displaying the status of the structural integrity of said helicopter blade, said operational control and displaying unit in operational communications with said interrogator unit;

wherein said indicator responder unit is comprised of a sensor module attached to said helicopter blade;

a machine controller in operational communications with said sensor module;

a first wireless communicator module in operational communications with said machine controller; and a first antenna in operational communications with said first communicator module; and wherein said interrogator unit and said operational control and displaying unit are contained within a handheld device.

2. The helicopter blade monitoring system of claim 1, wherein said at least one structural integrity sensor is capable of monitoring vibration.

3. The helicopter blade monitoring system of claim 1, wherein said at least one structural integrity sensor is capable of detecting and responding to a measurement of change of pressure of said pressurized gas.

4. The helicopter blade monitoring system of claim 1, wherein said indicator responder unit further comprises a battery.

5. The helicopter blade monitoring system of claim 1, wherein at least a portion of said helicopter blade is capable of pressurized with a gas.

6. The helicopter blade monitoring system of claim 5, wherein said sensor module is a device capable of responding to the pressure of said gas.

7. The helicopter blade monitoring system of claim 1, wherein said machine controller is a microprocessor.

8. The helicopter blade monitoring system of claim 1, wherein said first wireless communicator module is a transceiver.

9. The helicopter blade monitoring system of claim 1, wherein said interrogator unit is comprised of:

a second antenna in wireless communications with said first antenna; and a second wireless communicator module in operational communications with said second antenna.

10. The helicopter blade monitoring system of claim 1, wherein said operational control and displaying means further comprises at least one means for providing computer processing, said means for providing computer processing in operational communications with said second wireless communicator module.

11. The helicopter blade monitoring system of claim 1, further comprising at least one structural integrity waning indicator, said at least one structural integrity warning indicator capable of at least providing a user with an indication that the structural integrity of said helicopter blade is below acceptable limits.

* * * * *